(12) United States Patent
Williams, III et al.

(10) Patent No.: US 9,996,348 B2
(45) Date of Patent: Jun. 12, 2018

(54) ZERO CYCLE LOAD

(75) Inventors: Gerard R. Williams, III, Lost Altos, CA (US); John H. Mylius, Gilroy, CA (US); Conrade Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 13/517,865

(22) Filed: Jun. 14, 2012

(65) Prior Publication Data

US 2013/0339671 A1     Dec. 19, 2013

(51) Int. Cl.
*G06F 9/30* (2018.01)
*G06F 9/38* (2018.01)

(52) U.S. Cl.
CPC .......... *G06F 9/30043* (2013.01); *G06F 9/384* (2013.01); *G06F 9/3826* (2013.01)

(58) Field of Classification Search
None
See application file for complete search history.

(56) References Cited

U.S. PATENT DOCUMENTS

| | | |
|---|---|---|
| 5,751,983 A | 5/1998 | Abramson et al. |
| 5,926,646 A | 7/1999 | Pickett et al. |
| 6,065,103 A | 5/2000 | Tran et al. |
| 6,094,716 A | 7/2000 | Witt |
| 6,122,656 A * | 9/2000 | Witt .............................. 718/100 |
| 6,122,725 A | 9/2000 | Roussel et al. |
| 6,256,721 B1 | 7/2001 | Witt |
| 6,505,293 B1 * | 1/2003 | Jourdan et al. ................ 712/217 |
| 6,662,280 B1 | 12/2003 | Hughes |
| 6,701,425 B1 | 3/2004 | Dabbagh et al. |
| 7,263,600 B2 * | 8/2007 | Sander et al. ................. 712/218 |
| 7,467,239 B2 | 12/2008 | Nicolai et al. |
| 2004/0255101 A1 | 12/2004 | Filippo et al. |
| 2005/0066131 A1 | 3/2005 | Biles et al. |

(Continued)

FOREIGN PATENT DOCUMENTS

| | | |
|---|---|---|
| CN | 1136182 A | 11/1996 |
| EP | 0297265 | 1/1989 |

(Continued)

OTHER PUBLICATIONS

Extended European Search Report in European Application No. 13170357.1, dated Jun. 24, 2014, 6 pages

(Continued)

*Primary Examiner* — Corey S Faherty
(74) *Attorney, Agent, or Firm* — Rory D. Rankin; Meyertons, Hood, Kivlin, Kowert & Goetzel, P.C.

(57) ABSTRACT

A system and method for reducing the latency of load operations. A register rename unit within a processor determines whether a decoded load instruction is eligible for conversion to a zero-cycle load operation. If so, control logic assigns a physical register identifier associated with a source operand of an older dependent store instruction to the destination operand of the load instruction. Additionally, the register rename unit marks the load instruction to prevent it from reading data associated with the source operand of the store instruction from memory. Due to the duplicate renaming, this data may be forwarded from a physical register file to instructions that are younger and dependent on the load instruction.

19 Claims, 5 Drawing Sheets

(56) References Cited

U.S. PATENT DOCUMENTS

2008/0059770 A1  3/2008  Garg et al.
2011/0040955 A1  2/2011  Hooker et al.
2011/0320785 A1  12/2011 Chen et al.

FOREIGN PATENT DOCUMENTS

| JP | 2000181715 A | 6/2000 |
| JP | 2005532613 A | 10/2005 |
| JP | 2007503661 A | 2/2007 |
| JP | 2007536626 A | 12/2007 |
| TW | 201003517 A | 1/2010 |
| WO | 2003093982 A1 | 11/2003 |
| WO | 2005111794 | 11/2005 |

OTHER PUBLICATIONS

Akkary, Haitham, et al. "An Analysis of a Resource Efficient Checkpoint Architecture", ACM Transactions on Architecture and Code Optimization, Dec. 2004, pp. 418-444, vol. 1, No. 4, New York, USA.

Office Action in Japanese Patent Application No. 2013-125333, dated Oct. 20, 2014, 8 pages.
International Search Report and Written Opinion in application No. PCT/US2013/043318 dated Dec. 16, 2013 pp. 1-11.
Notice of Preliminary Rejection in Korean Patent Application No. 10-2013-68008, dated Aug. 18, 2014, 11 pages.
Final Office Action in Japanese Patent Application No. 2013-125333, dated Jun. 29, 2015, 5 pages.
Office Action in Taiwan Patent Application No. 102120951, dated Mar. 17, 2015, 11 pages.
Decision of Grant in Japanese Patent Application No. 2013-125333, dated Feb. 1, 2016, 3 pages.
Notification of the First Office Action in Chinese Application No. 201310236291.X, dated Jan. 25, 2016, 19 pages.
Notification of the Second Office Action in Chinese Application No. 201310236291.X, dated Sep. 7, 2016, 18 pages.
Rejection Decision in Chinese Application No. 201310236291.X, dated Aug. 10, 2017, 20 pages.
Notification of the Third Office Action in Chinese Application No. 201310236291.X, dated Mar. 7, 2017, 10 pages.

* cited by examiner

ZERO CYCLE LOAD

BACKGROUND OF THE INVENTION

Field of the Invention

This invention relates to microprocessors, and more particularly, to efficiently reducing the latency and power of load operations.

Description of the Relevant Art

Microprocessors typically include overlapping pipeline stages and out-of-order execution of instructions. Additionally, microprocessors may support simultaneous multi-threading to increase throughput. These techniques take advantage of instruction level parallelism (ILP) in source code. During each clock cycle, a microprocessor ideally produces useful execution of a maximum number of N instructions per thread for each stage of a pipeline, wherein N is an integer greater than one. However, control dependencies and data dependencies reduce maximum throughput of the microprocessor to below N instructions per cycle.

Speculative execution of instructions is used to perform parallel execution of instructions despite control dependencies in the source code. A data dependency occurs when an operand of an instruction depends on a result of an older instruction in program order. Data dependencies may appear either between operands of subsequent instructions in a straight line code segment or between operands of instructions belonging to subsequent loop iterations. In straight line code, read after write (RAW), write after read (WAR) or write after write (WAW) dependencies may be encountered. Register renaming is used to allow parallel execution of instructions despite the WAR and WAW dependencies. However, the true dependency, or RAW dependency, is still intact. Therefore, architectural registers repeatedly used as a destination register and subsequently as a source register cause serialization of instruction execution for associated source code segments.

One example of a common RAW dependency with an architectural register is a load instruction, or a read operation, attempting to read a memory location that has been modified by an older (in program order) store instruction that has not yet committed its results to the memory location. This type of RAW dependency may occur frequently during program execution. Reading the memory location may include an appreciable latency and reduce processor throughput.

In view of the above, efficient methods and mechanisms for efficiently reducing the latency of load operations are desired.

SUMMARY OF EMBODIMENTS

Systems and methods for efficiently reducing the latency of load operations. In one embodiment, a processor includes a register rename unit that receives decoded instructions and determines whether a decoded given instruction qualifies to be a zero-cycle load operation. An example of a qualifier may include a predicted memory dependence for a given load instruction on a given store instruction. In addition, a qualifier may include detection of available support exists for maintaining a duplicate count of mappings for a given physical register number. If the determination is true, the rename register unit may assign a physical register number associated with a source operand of the given store instruction to the destination operand of the given load instruction.

Further, control logic within the register rename unit may mark the given load instruction to prevent it from reading data associated with the source operand of the store instruction from memory. Due to the duplicate renaming, this data may be forwarded from a physical register file to instructions that are younger (in program order) and dependent on the given load instruction. In a later pipeline stage, the predicted memory dependence may be verified. If the memory dependence is correct, then the given load instruction may be considered complete without reading operand data from memory (data cache) or from the store buffer. If the memory dependence is incorrect, then the given load instruction and younger (in program order) instructions may be flushed from the pipeline and replayed.

These and other embodiments will be further appreciated upon reference to the following description and drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
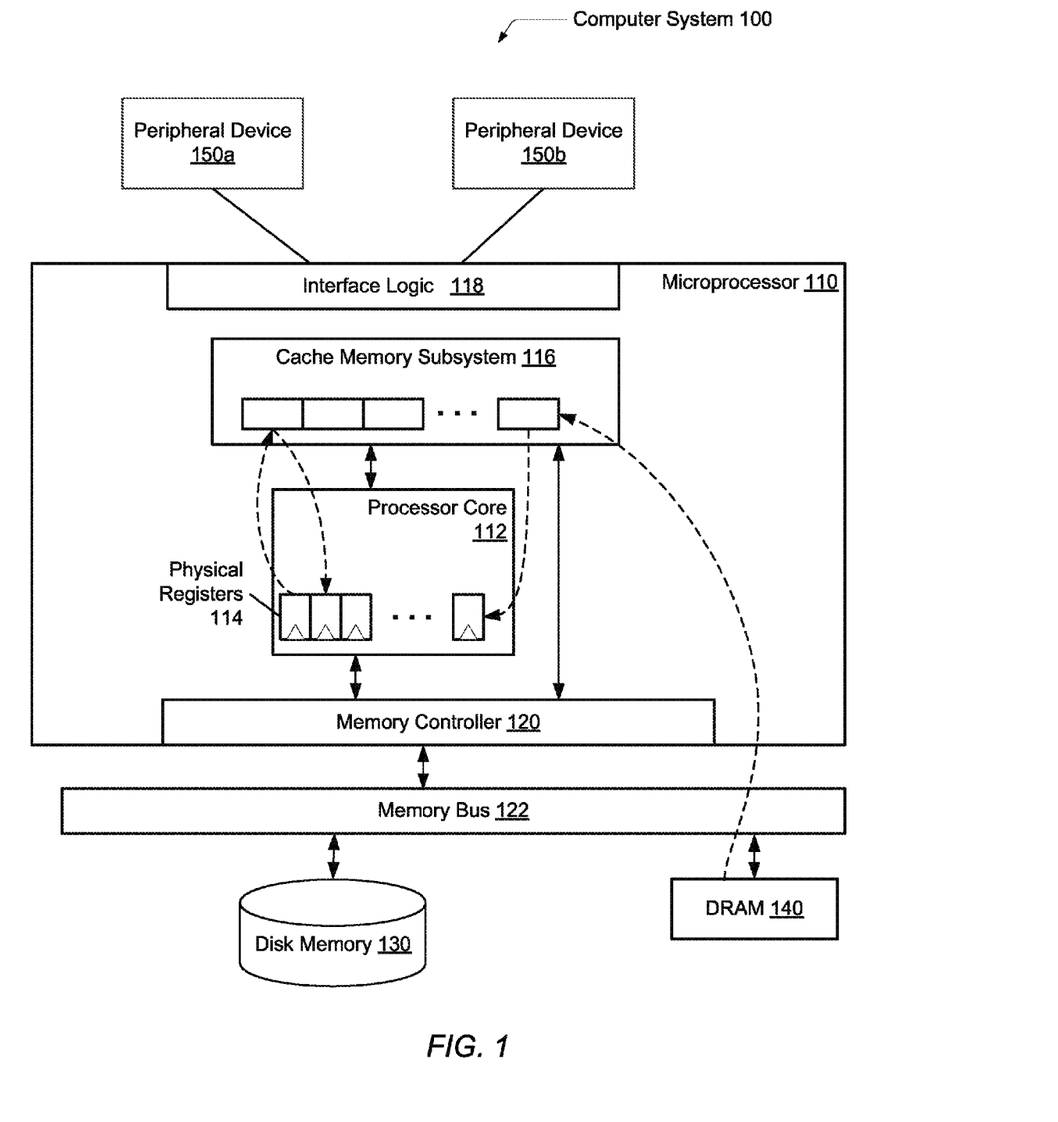
FIG. 1 is a generalized block diagram of one embodiment of a computer system.

Referring to FIG. 1, a generalized block diagram of one embodiment of a computer system 100 is shown. As shown, a microprocessor 110 may be connected to one or more peripheral devices 150a-150b, and external computer memory, such as disk memory 130 and dynamic random access memory (DRAM) 140. The disk memory 130 may store an operating system (OS) for the computer system 100. Instructions of a software application may be loaded into the cache memory subsystem 116 within the microprocessor 110. The software application may have been stored in one or more of the disk memory 130, the DRAM 140 and one of the peripheral devices 150a-150b.

Although a single processor core is shown, the microprocessor 110 may include multiple processor cores. Each processor core may be connected to an associated cache memory subsystem. In addition, each processor core may share another cache memory subsystem. For example, each one of multiple processor cores may utilize an associated level-one (L1) cache and a level-two (L2) and additionally share a level-three (L3) cache with the other processor cores. As shown, the processor core 112 may load the software application instructions from the cache memory subsystem 116 and process the instructions. Generally speaking, when software programmers write applications to perform work according to an algorithm or a method, the programmers utilize variables to reference temporary and result data. This data utilizes space allocated in computer memory. The operating system allocates regions of memory for the software application.

The processor core 112 may include multiple physical registers 114 within a physical register file. The physical registers 114 may include architecturally visible registers that a software programmer and/or a compiler may identify within the software application. In addition, the physical registers 114 may include non-architectural (speculative) registers identified by renamed register identifiers. The architecturally visible registers are associated with a given instruction set architecture (ISA). During processing of the application, the data may be loaded from the allocated regions of memory into the cache memory subsystem 116. One or more of the physical registers 114 may be used to load and store the temporary data and result data. The hardware in the processor core 112 includes circuitry for processing instructions according to the given ISA. The hardware circuitry includes at least an associated set of architectural registers, functional units, pipeline staging elements and control logic. The ARM instruction set architecture may be selected for the given ISA. Alternatively, the Alpha, PowerPC, SPARC, MIPS, x86, or any other ISA may be selected.

The given ISA may be used to select a manner for declaring and allocating regions of memory. The given ISA may further determine a selected addressing mode used to transfer data between the microprocessor 110, including the physical registers 114 and memory locations in one or more of the disk memory 130, the DRAM 140 and the peripheral devices 150a-150b. Both load and store instructions are typically used to transfer data between memory and the microprocessor 110 and between the cache memory subsystem 116 and the physical registers 114. The dashed lines shown in the computer system 100 indicate examples of the data transfers performed by load and store operations. An appreciable latency may be associated with each of these data transfers.

In addition to out-of-order issue of instructions to execution units within a superscalar microarchitecture, the processor core 112 may perform register renaming to increase throughput. Using hardware, the processor core 112 dynamically renames an architectural register identifier used for a destination operand. Source operands with a same architectural register identifier as the destination operand may be renamed with a same renamed register identifier used for the destination operand.

In one embodiment, the processor core 112 includes control logic that detects store instructions in an early pipeline stage and buffers at least associated address operand identifiers. The early pipeline stages may process instructions in-order, whereas the instructions may be issued and executed out-of-order in later pipeline stages. The address operands of a given store instruction are used in a later execution pipeline stage to generate the store address. The address operands may include an architectural register identifier (ID) used as a base register ID and an immediate value used as an offset.

In the early pipeline stage, the control logic within the processor core 112 may monitor subsequent instructions to determine whether one or more of these instructions modify one or more address operands for a given store instruction. For example, the address operand ID may be found to match destination operand IDs in one or more subsequent instructions. This monitoring may occur in a pipeline stage prior to the out-of-order issue and execution pipeline stages.

The control logic may continue monitoring subsequent instructions for the given store instruction until a corresponding entry in the physical register file is deallocated. This entry may be deallocated in response to an associated renamed register identifier is removed from a mapping table and returned to a free list. For example, an instruction subsequent (in program order) to the store instruction may have a destination operand identifier (destination architectural register identifier) equal to the source operand identifier (source architectural register identifier) of the given store instruction. When the subsequent instruction commits, the renamed register identifier that was previously assigned to the subsequent instruction's destination operand is placed in the free list for reuse by another instruction. This freed renamed register identifier is a same identifier used for the source operand of the given store instruction. In response to detecting the above condition, monitoring for the given store instruction may terminate. Further details and an example are provided shortly.

In one embodiment, during monitoring, the control logic may determine a subsequent load operation has matching address operands as the given store instruction and these address operands have not been modified by intervening instructions. In addition, the control logic may determine no other store instruction with the same address operands is located between the given store instruction and the load instruction. In other words, the given store instruction is the youngest store instruction with the address operands. In response to this determination, an indication of a RAW dependency between this load instruction and the given store instruction may be set or asserted. In another embodiment, additional information, such as at least instruction tags and program counter values, may be compared or used to index prediction tables. The control logic may predict in this early pipeline stage that a RAW dependency exists between this load instruction and the given store instruction. A determination or a prediction of this RAW dependency may occur in a same pipeline stage as register renaming. Alternatively, the determination or prediction may occur in an earlier pipeline stage than a stage used for register renaming. An example of this RAW dependency is provided here:

| ADD | r7, r3, r5 | |
|---|---|---|
| STORE | [r10 + 4], r7 | // Address operands are r10 and 4. |
| MOV | r12, r16 | |
| LOAD | r14, [r10 + 4] | // Address operands are r10 and 4. |
| SUB | r2, r6, r14 | // For r14, use forwarded data from |
| | | // store op's source operand, r7. |
| ADD | r11, r14, r13 | // For r14, use forwarded data from |
| | | // store op's source operand, r7. |

In this example, a destination operand is listed first after an instruction mnemonic followed by one or more source operands. Registers use the general nomenclature of "r" followed by a register identifier. For example, register 7 is denoted by "r7". The instructions in the above example are meant to be a pseudocode example and language agnostic. As can be seen above, the load instruction has the same address operands as the store instruction. No intervening instructions modify the address operands (r10). Thus, the control logic may determine the load instruction has a RAW dependency on the store instruction. In other embodiments, prediction qualifications may be used, such as comparing instruction tags, which are not shown for ease of illustration.

In response to determining or predicting the RAW dependency, the destination operand identifier (ID) (r14) of the load instruction may be renamed to a same renamed register identifier used for the source operand ID (r7) of the store instruction. For example, if the source operand ID (r7) of the store instruction is renamed to a renamed register identifier P44, then the destination operand ID (r14) of the load instruction may be renamed to the same identifier (P44). Similarly, the source operand ID r14 for each of the subtraction instruction and the least addition instruction may be renamed to the same renamed register identifier (P44).

The control logic within the processor core 112 may issue out-of-order the load instruction and subsequent instructions. In this case, each of the subtraction instruction and the last addition instruction may issue before, during, or shortly after the load instruction although the load instruction has not completed. If the source operands for the register identifiers r6 and r13 are available, the subtraction instruction and the last addition instruction may issue prior to the load instruction is issued let alone is completing. These instructions may issue with data forwarded from the architectural source register ID r7, which is the source operand ID for the store instruction. With the use of register renaming, the data to be forwarded may be stored in the physical register identified by the renamed register identifier P44, which is associated with the source architectural register ID r7. Therefore, the load instruction becomes a zero cycle operation. The load instruction may complete without accessing memory, such as an on-chip multi-level cache hierarchy and an off-chip memory.

If the above steps are taken and the load instruction is converted to a zero cycle operation, then instruction throughput may increase for the pipeline. Instruction throughput may increase since the instructions that are younger (in program order) and dependent on the load instruction do not wait for data to be retrieved for the load instruction from a data cache, a store buffer, or an off-chip memory. Rather, these younger, dependent instructions may receive the data from the physical register file. Before continuing with further details regarding the conversion of load instructions to zero-cycle load operations, a further description of the components in the computer system 100 is provided.

In addition to including one or more processor cores connected to corresponding cache memory subsystems, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die with other processor dies on a system-on-a-chip (SOC).

The processor core 112 may include circuitry for executing instructions according to a given ISA as described earlier. In one embodiment, the processor core 112 may include a superscalar, multi-threaded microarchitecture used for processing instructions of a given ISA. In some embodiments, the processor core is a general-purpose processor core. In various other embodiments, the microprocessor 110 may include one or more other specific cores, such as a digital signal processor (DSP), a graphics processing unit (GPU), an application specific integrated circuit (ASIC), and so forth.

The cache memory subsystem 116 may reduce memory latencies for the processor core 112. A reduced miss rate achieved by the additional memory provided by the cache memory subsystem 116 helps hide the latency gap between the processor core 112 and the off-chip memory. Although the latency between the processor core 112 and the cache memory subsystem 116 is smaller than the latency to the off-chip memory, this latency may be further reduced if the load instruction is converted to a zero-cycle load operation as described earlier.

If a cache miss occurs, such as a requested block is not found in the cache memory subsystem 116, then a read request may be generated and transmitted to the memory controller 120. The memory controller 120 may translate an address corresponding to the requested block and send a read request to the volatile off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 140 may be filled with data from the off-chip disk memory 130. The off-chip disk memory 130 may provide a non-volatile, random access secondary storage of data. In one embodiment, the off-chip disk memory 130 may include one or more hard disk drives (HDDs). In another embodiment, the off-chip disk memory 130 utilizes a Solid-State Disk (SSD).

Although only two peripheral devices are shown in the computer system 100 for illustrative purposes, another number of peripheral devices may be connected to the microprocessor 110. One or more of the peripheral devices 150a-150b may be a display including a modern TV, a computer monitor, a laptop or mobile device monitor, and so forth. A video graphics subsystem may be used between the display and the microprocessor 110. One or more of the peripheral devices 150a-150b may be one of a typically utilized input/output device such as a keyboard, mouse, printer, modem, and so forth.

Figure 2:
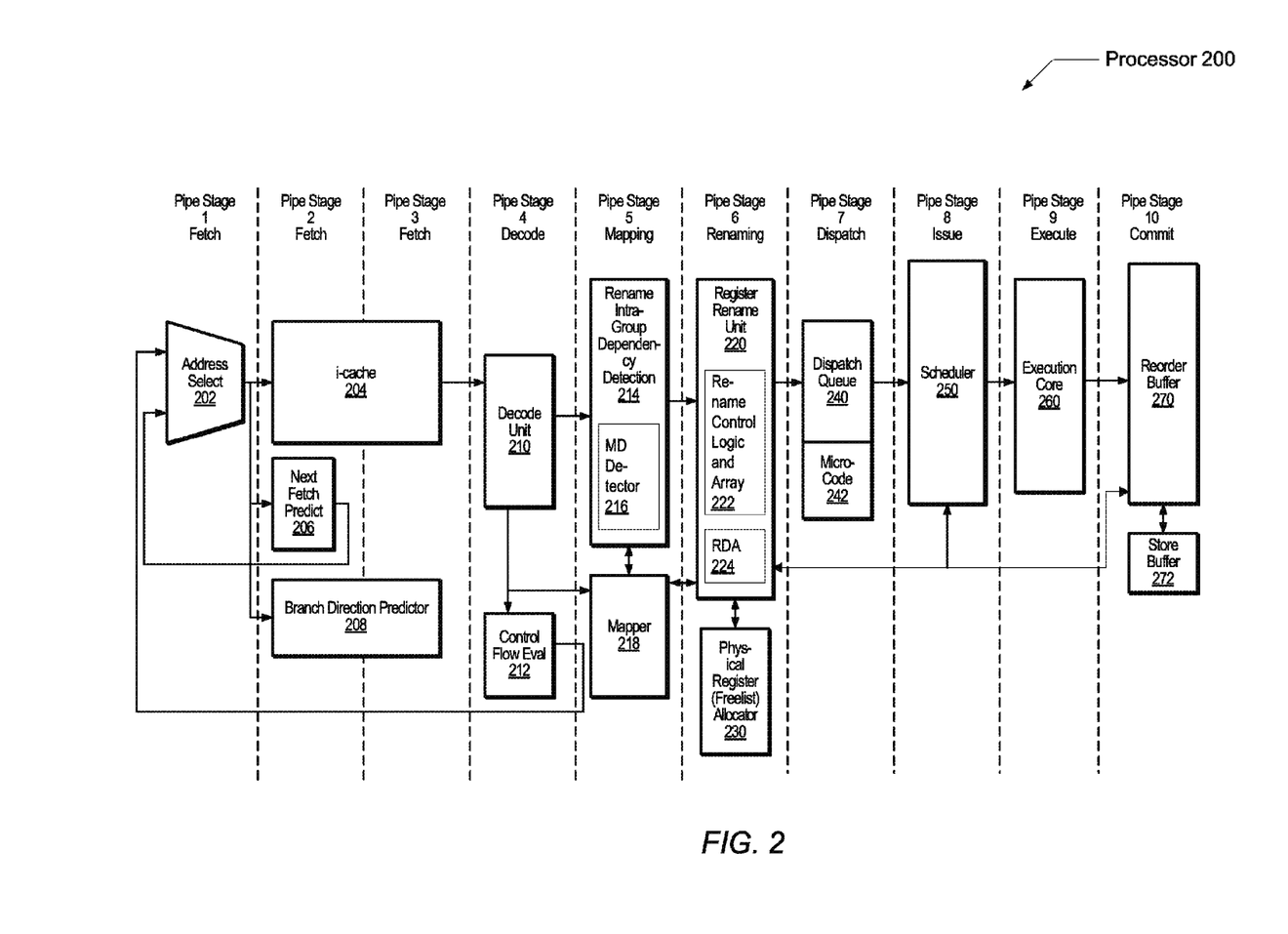
FIG. 2 is a generalized block diagram of one embodiment of a processor core that performs superscalar, out-of-order execution with zero-cycle load operations.

Referring now to FIG. 2, a generalized block diagram illustrating one embodiment of a processor core 200 that performs superscalar, out-of-order execution with zero-cycle load operations is shown. The processor core 200 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction-cache (i-cache) 204 may store instructions for a software application. One or more instructions indicated by an address conveyed by address select logic 202 may be fetched from the i-cache 204. Multiple instructions may be fetched from the i-cache 204 per clock cycle if there are no i-cache misses. The address may be incremented by a next fetch predictor 206. A branch direction predictor 208 may be coupled to each of the next fetch predictor 206 and the control flow evaluation logic 212 in a later pipeline stage. The predictor 208 may predict information of instructions that change the flow of an instruction stream from executing a next sequential instruction.

The decode unit 210 decodes the opcodes of the multiple fetched instructions. Alternatively, the instructions may be divided into micro-ops. As used herein, the terms "instructions", "micro-ops", and "operations" are interchangeable as the invention may be used with an architecture that utilizes either implementation. In one embodiment, the control flow evaluation block 212 may alter fetch of instructions in the address selector 202. For example, an absolute address value associated with an unconditional branch opcode may be sent to the address selector 202.

Rename intra-group dependency detection logic 214 may find dependencies among instructions decoded by the decode unit 210. An intra-group of instructions may include decoded instructions from one or more clock cycles, or pipeline stages. Dependencies such as write-after-read (WAR), write-after-write (WAW) and read-after-write (RAW) may be detected. Dependency vectors that indicate dependencies between instructions may be generated.

The dependency detection logic may include a memory dependence (MD) detector 216. In some embodiments, the MD detector 216 may determine store-to-load (STL) memory dependences. In these embodiments, a table may be used to store a base register ID and an immediate value (offset value) used as address operands for a given store instruction. In addition, a source operand register ID for the store instruction may be stored. For younger (in-program-order) instructions, destination operand register IDs, address operand register IDs, and immediate values may be compared to values stored in the table. The MD detector 216 may indicate a STL memory dependence exists between a younger load instruction and the given store instruction in response to determining certain conditions are satisfied. One condition may be the younger load instruction has an address operand register ID and an address operand intermediate value that matches address operand values for the store instruction. A second condition may be it is determined no intervening instructions modify the values stored in the table for the given store instruction. A third condition may be the store instruction is determined to be the youngest store instruction that is older than the load instruction with the matching address operands. The MD detector 216 may store an indication that a RAW dependency exists between the load instruction and the given store instruction.

Additionally, the MD detector 216 may send an indication to the register rename unit 220 to rename the destination operand register ID of the load instruction with a same renamed register identifier used for the source operand register ID of the given store instruction. In other embodiments, a compiler may analyze code and perform the above-described steps. If the compiler determines a RAW dependency exists between the younger load instruction and the given store instruction, then the compiler may insert an indication in the program code to be detected by at least the MD detector 216. The information may include an asserted bit and the source operand register ID of the given store instruction. Alternatively, the information may include an asserted bit and a program counter (PC) offset used to identify the given store instruction. Other information may be used.

In yet other embodiments, the MD detector 216 may include a predictor for STL memory dependences. In such embodiments, the MD detector 216 may index one or more tables with at least program counter (PC) values associated with load and store instructions. Partial address tags and other instruction identifying information may also be used to index the tables. An output of a hash function may be used to index the prediction tables, which store saturating counters or other prediction information. In some embodiments, the MD detector 216 may determine these address operands have not been modified by intervening instructions. In other embodiments, the MD detector 216 may allow correcting logic, such as the saturation counters, to account for mispredictions. The information read out from the tables may be used to identify speculated dependences. In response to determining a speculative RAW memory dependency, the MD detector 216 may store an indication that a RAW dependency exists between a given store instruction and a given subsequent load instruction. Additionally, the MD detector 216 may send an indication to the register rename unit 220 to rename the destination operand register ID of the load instruction with a same renamed register identifier used for the source operand register ID of the given store instruction. In further embodiments, a combination of the above methods and mechanisms for finding STL memory dependences may be used.

The mapper 218 may divide instructions among distributed hardware resources using factors such as available concurrency, criticality of dependence chains, and communication penalties. When the hardware renames an architectural register identifier with a physical register identifier, the hardware stores the mapping in the mapper 218, which may be a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

The register rename unit 220 may include rename control logic and array 222 and a register duplication array (RDA) 224. The register rename unit 220 may determine which physical register identifiers to use to rename architectural register identifiers used in both destination and source operands within instructions. The register rename unit may select candidate physical register identifiers from the free list allocator 230 or a rename mapping table within the rename control logic 222. In various embodiments, the RDA 224 is configured to store an indication of duplicate mappings. The duplicate mappings may be used during conversion of a load operation to a zero-cycle load operation.

The register rename unit 220 may receive an indication from the MD detector 216 that a load instruction qualifies to be converted to a zero cycle load operation. The register rename unit 220 may assign the destination operand register ID of the load instruction to a same rename register identifier as used for the source operand register ID of a store instruction that the load operation is dependent upon. The mapper 218 may store the multiple mappings for the rename register identifier. Additionally, the RDA 224 may store a duplicate count for the rename register identifier. For example, in the earlier code example, the rename register identifier P44 may be used for both the source operand register ID (r7) of the store instruction and the destination operand register ID (r14) of the load instruction. This duplicate count may include the number of times any given architectural register identifier has been mapped to the same rename register identifier.

In various embodiments, the duplicate count may not be incremented for a mapping when a particular architectural register is already mapped to the rename register number at the time of the mapping. The RDA 224 may store both the rename register number and the associated duplicate count. In one embodiment, the RDA may be implemented as a relatively small, tagged, fully-associative structure. The RDA 224 may have any number of entries for storing a rename register number and an associated duplicate count. In one example, an implementation of an ISA may include 144 physical register numbers, and thus, an 8-bit physical register index may be both stored in an entry of the RDA and used to access the RDA. In one embodiment, each duplicate count size is 5 bits. Therefore, a maximum number of duplications for a given physical register number is 31. However, another duplicate count size may be possible and chosen.

The RDA 224 may be updated before or at the time of instruction dispatch in the processor pipeline. When the MD detector 216 determines a decoded load instruction is a zero-cycle load operation, the RDA 224 may be accessed to determine whether an entry already exists for the physical register number to be used to rename each of the source operand register ID of an associated store instruction and the destination operand register ID of the load instruction. If an entry exists, then the associated duplicate count may be incremented each time any given architectural register ID currently not mapped to the given rename register number is mapped to the given rename register number. If an entry does not already exist in the RDA, then an entry may be allocated and the associated duplicate count may be initiated at two.

The RDA 224 may also be updated during a commit pipeline stage in the processor pipeline. The duplicate count may be decremented each time the physical register identifier is ready to return to the free list for any given architectural register during an instruction commit. The physical register identifier may also be referred to as the rename register identifier. A physical register identifier may be a candidate to return to the free list in response to an entry in the mapping table associated with the physical register identifier is removed or invalidated due to the instruction commit. In one embodiment, in response to the duplicate count decreasing to one, the duplicate count and the duplicate mappings may no longer be stored.

In one embodiment, in response to a given rename register identifier is a candidate to return to the free list during an associated instruction commit, and no associated duplicate information is stored in the RDA 224, the rename register identifier is returned to the free list. In another embodiment, in response to a given rename register identifier is a candidate to return to the free list and the stored duplicate count in the RDA 224 is decremented by one to zero, the rename register identifier is returned to the free list.

In one embodiment, in response to a given rename register identifier is a candidate to return to the free list and the stored duplicate count is still greater than one after being decremented, the rename register identifier is not returned to the free list. The rename register identifier still has duplicate mappings to multiple architectural registers in this last case. In one embodiment, the RDA 224 is checked for each potential zero-cycle load candidate to make sure there is an entry free for tracking a duplicate. If there is not an entry free for allocation within the RDA 224, then a corresponding load instruction is not converted to a zero-cycle load operation. Similarly, if an allocated entry exists for the zero-cycle load candidate, but the duplicate count is already saturated, then the load instruction is not converted to a zero-cycle load operation.

For a zero-cycle load operation, the data contents may be forwarded from a physical register within the physical register file that stores data for the store instruction source operand to the subsequent load instruction and to other younger, dependent instructions. The data may not be read from a data cache, a store buffer, or off-chip memory. The younger, dependent instructions may issue without waiting for data being read from the data cache, the store buffer, or off-chip memory.

After instructions have been decoded and renamed, associated entries may be allocated in the dispatch queue 240. Instructions and associated renamed identifiers, program counter (PC) values, dependency vectors, markings for completion, and so forth may be sent to the dispatch queue 240 and later to the scheduler 250. Various exceptions may be detected, such as by the execution core 260. Examples include protection exceptions for memory accesses, no address translation, and so forth. The exceptions may cause a corresponding exception handling routine to be executed, such as by the microcode 242.

The scheduler 250 may schedule instructions for execution in the execution core 260. When operands are available and hardware resources are also available, an instruction may be issued out-of-order from the scheduler 250 to one of the functional units within the execution core 260. The scheduler 250 may read its source operands from the physical register file (not shown) after translating renamed identifiers with a mapping table or from operand bypass logic. The source operands may be provided to the execution core 260. The execution core 260 may resolve addresses for load and store instructions. In addition, the execution core 260 may perform one or more of multiple integer, floating-point, and Boolean operations.

The execution core 260 may include a load/store unit. The load/store unit may be connected to a data cache (not shown) and the store buffer 272 either directly or through the reorder buffer (rob) 270. The processor 200 may include a translation look-aside buffer (TLB) for each of the i-cache 204 and the data cache to avoid a cost of performing a full memory translation when performing a cache access. The store buffer 272 may store addresses corresponding to store instructions. The rob 270 may receive results from the execution core 260. In addition, results may be bypassed to previous pipeline stages for data forwarding to dependent instructions already in the pipeline. The rob 270 may ensure in-order commit and retirement of instructions.

Figure 3:
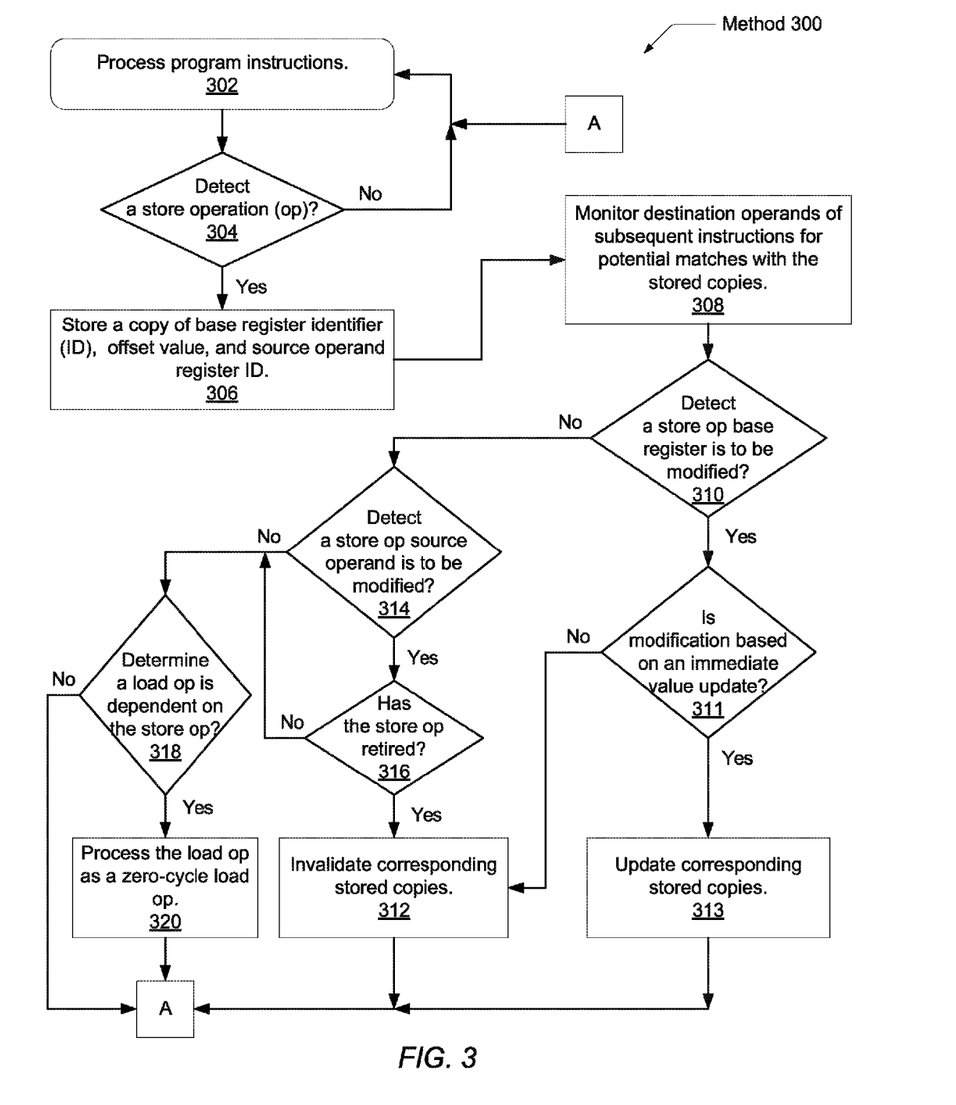
FIG. 3 is a generalized flow diagram of one embodiment of a method for detecting zero-cycle load operations.

Referring now to FIG. 3, a generalized flow diagram of one embodiment of a method 300 for detecting zero-cycle load operations is shown. In block 302, program instructions are processed. The instructions may be compiled, fetched from memory, decoded and executed. After decoding, if a given instruction is detected to be a store instruction (conditional block 304), then in block 306, at least the address operand base register ID, address operand immediate value, and the source operand register ID of the store instruction are buffered. These values may be stored in a given table. An associated program counter (PC) and other information may also be buffered. In one embodiment, this information is buffered in a table within the memory dependency (MD) detector.

In block 308, information of subsequent (in program order) instructions is monitored for potential matches with the buffered information for the previous (in program order) store instructions. The information for comparisons may include at least the destination operand register IDs of subsequent instructions and the address operand base register ID and immediate value of subsequent load instructions. Control logic may detect a match between a register ID associated with a given store instruction and a register ID associated with a subsequent instruction. The register IDs may be architectural register IDs used to identify operands.

A modification of a store instruction's address operand base register may be an immediate value based update. Using the earlier code example, an addition instruction may follow (in program order) the store instruction, such as ADD r10, r10, #4. The symbol "#" may be used to indicate an immediate value data operand. The address operand base register r10 of the store instruction is modified. However, it is an immediate value based modification. If no other type of modification is made to the address operand base register r10 other than immediate value based modification by intervening instruction between the load instruction and the store instruction, then an adjustment may be performed within the table to account for the immediate value based modification. If an address operand base register of a given store instruction is detected to be modified (conditional block 310) and the modification is based on an immediate value update (conditional block 311), then in block 313, particular stored values in the table for the given store instruction are updated. For example, the stored address operand immediate value may be updated. Using the above example, the stored immediate value of 4 within the table for the given store instruction may be decremented within the table by 4, which is the immediate value used by the ADD instruction. In other examples, the address operand base register may be decremented, rather than incremented, and the immediate value stored within the table may be incremented accordingly. If the modification is not based on an immediate value update (conditional block 311), then in block 312, the table entry storing values corresponding to the given store instruction may be invalidated. Afterward, the control flow of method 300 may return to block 302 through block A.

If the source operand of the given store instruction is detected to be modified (conditional block 314) and the store instruction has retired (conditional block 316), then control flow of method 300 moves to block 312. To illustrate this case, another code example of a memory dependence with modification of the store instruction's source operand and a race condition is provided here:

```
ADD    r7, r3, r5
STORE  [r10 + 4], r7    // Address operands are r10 and 4.
ADD    r19, r24, r18
```

```
ADD    r7, r20, r21     // Store op source operand is
                        // modified.
LOAD   r14, [r10 + 4]   // Address operands are r10 and 4.
SUB    r2, r6, r14      // For r14, use forwarded data from
                        // store op's source operand, r7.
ADD    r7, r14, r13     // For r14, use forwarded data from
                        // store op's source operand, r7.
ADD    r14, r22, r25    // The load op destination operand is
                        // overwritten. During commit stage,
                        // return physical register number
                        // shared by r7 & r14 to the free list.
```

Similar to the earlier code example, in the above example, the load instruction has a memory dependence on the store instruction. In this case, the third addition instruction modifies the source operand (r7) of the store instruction. There may be a race condition in the pipeline between the load instruction marking the renamed register identifier associated with the source operand (r7) as a duplicate and the third addition instruction committing and causing the same rename register identifier to return to the free list. By the time the load instruction marks this rename register identifier as a duplicate, the rename register identifier may already be in a history file propagating toward the free list.

One option for handling the above case is to detect an intervening instruction, such as the third addition instruction, modifies the source operand of the store instruction, and in response, disqualify the load instruction from being converted to a zero-cycle load operation. Another option for handling the above case is to detect an intervening instruction modifies the source operand of the store instruction, and in response, determine whether the store instruction has retired. If the store instruction has not retired, then the intervening instruction has not retired. Therefore, the intervening instruction has not yet caused the rename register identifier associated with the source operand of the store instruction to be returned to the free list. A duplicate count of this rename register identifier may now be maintained. Similarly, a duplicate count may be incremented for the destination operand (r14) of the load instruction due to the last addition instruction in the above code example.

Returning to method 300, if the source operand of the given store instruction is detected to be modified (conditional block 314) and the store instruction has not retired (conditional block 316), then it is determined whether a load instruction may have a memory dependence on the given store instruction. Similarly, if the source operand of the given store instruction is not detected to be modified (conditional block 314), then it is determined whether a load instruction may have a memory dependence on the given store instruction. It is noted in some embodiments each of the conditional blocks 310, 314, and 318 may be evaluated at a same time. For example, control logic and tables may receive inputs associated with the subsequent instructions at a same time.

In one embodiment, a memory dependence (MD) detector is accessed with information associated with the load instruction. As described earlier, the MD detector may include a table holding information for particular store instructions to be compared with subsequent instructions. Alternatively, the MD detector may include control logic for detecting hint information from the compiler. The MD detector may also include a STL predictor. Further, the MD detector may include a combination of these alternative design choices. In response to accessing the MD detector, both control logic and the table(s) storing values for the given store instruction and other store instructions may generate a result indicating a memory dependence exists between the load instruction and the given store instruction. For example, in one embodiment, the address operand base register ID and immediate value for each of the load instruction and the given store instruction may match. In addition, the store instruction may be determined to be the youngest store instruction that is older than the load instruction with the matching address operands. If a load instruction is determined to be dependent on the given store instruction (conditional block 318), then in block 320, the load instruction may be processed as a zero-cycle load instruction. Next, further details of processing a zero-cycle load instruction are provided.

Figure 4:
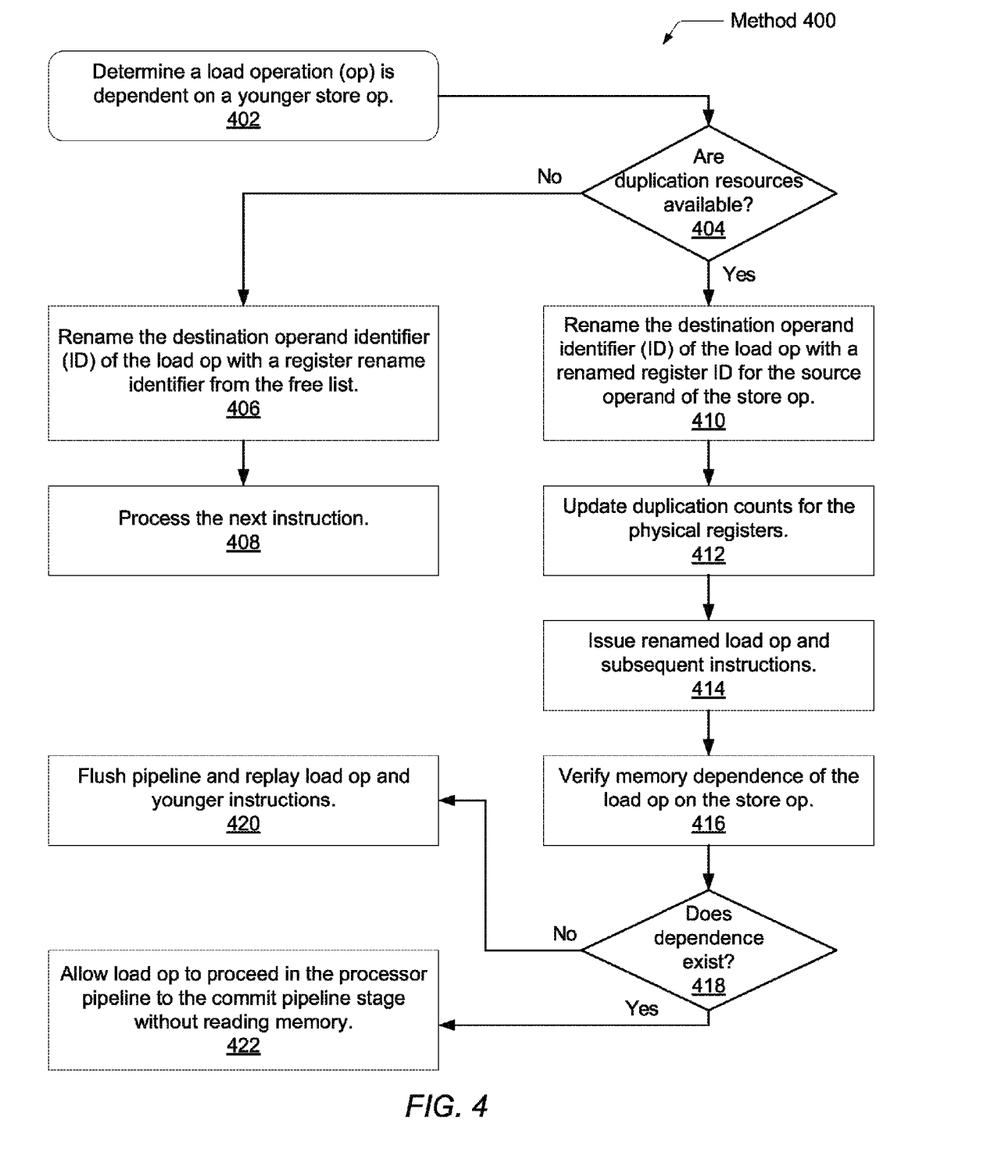
FIG. 4 is a generalized flow diagram of one embodiment of a method for processing zero-cycle load operations.

Referring now to FIG. 4, a generalized flow diagram of one embodiment of a method 400 for processing a zero-cycle load operation is shown. In block 402, a given load instruction may be determined to be dependent on an older (in program order) store instruction. The given load instruction may qualify to be converted to a zero-cycle load instruction. As described earlier, one condition may be the younger load instruction has an address operand register ID and an address operand intermediate value that matches address operand values for the store instruction. A second condition may be it is determined no intervening instructions modify the values, such as the address operands and source operand, stored in an accessed table for the given store instruction. A third condition may be the store instruction is determined to be the youngest store instruction that is older than the load instruction with the matching address operands. A fourth condition may be an indication of available duplication resources. For example, the rename register number for the source operand register ID of the store instruction may be used to index into a data structure such as the RDA 224. In other embodiments, a STL memory dependence predictor and/or hint information from the compiler may be used to indicate the RAW dependency between the load instruction and the given store instruction.

A hit in the RDA 224 may indicate the source renamed register identifier is already duplicated. A miss may indicate the source rename register identifier is not already duplicated. If the source renamed register identifier is not already duplicated and the RDA 224 is not already full, then an entry in the RDA 224 may be allocated for the source renamed register identifier. If the source renamed register identifier is already duplicated, then a duplicate count for the source renamed register identifier may be compared to a given threshold. In one embodiment, the threshold may correspond to a particular count. If an associated duplicate count has not reached the threshold, then duplicate resources are available. If the associated duplicate count has reached the threshold, then duplicate resources are unavailable.

If duplicate resources are unavailable (conditional block 404), then in block 406, the destination architectural register for the load instruction is renamed with a rename register identifier from the free list. The renamed identifier, an associated program counter (PC) value, dependency vectors, and so forth may be sent to a dispatch queue and later to a scheduler. In block 408, a next available instruction may be processed. The next available instruction may be processed in parallel with the above steps or in a subsequent clock cycle.

If duplicate resources are unavailable (conditional block 404), then in block 410, the destination operand identifier (ID) of the load instruction is renamed with a renamed register ID used for the source operand of the youngest older dependent store instruction. In block 412, a duplication count for the physical registers is updated. The duplicate count may be incremented each time a given architectural register identifier currently not mapped to the selected rename register identifier is mapped to this rename register identifier. In one embodiment, the duplicate count may be initialized with a value of two.

The renamed identifiers for the load instruction and one or more other instructions may be sent to a dispatch queue and later to a scheduler. Associated program counter (PC) values, dependency vectors, and so forth may also be sent. In one embodiment, the RAW dependency is considered certain and the load instruction may be marked as complete. For example, the access of the table in the MD detector as described in method 300 may be considered to have no uncertainty and therefore, the load instruction is not further processed by later pipeline stages. In other embodiments, the RAW dependency between the load and the store instructions is not considered to have no uncertainty. Therefore, the load instruction is not marked as complete and it is further processed by later pipeline stages. In block 414, one or more instructions including the load instruction when not marked as complete are issued in the pipeline. In block 416, the memory dependence between the store instruction and the load instruction may be verified. For example, an access into a store buffer with a resolved address and other instruction identifying information may be performed.

If the memory dependence is found to be incorrect (conditional block 418), then in block 420 the load instruction and instructions younger (in program order) than the load instruction may be flushed from the pipeline. The load instruction may then be replayed. If the predicted memory dependence is found to be correct (conditional block 418), then in block 422 the load instruction proceeds in the pipeline to the commit pipeline stage without reading data associated with the source operand from on-chip cache hierarchy, the store buffer, or off-chip memory. Younger instructions dependent on the load instruction may continue with the forwarded data received from the physical register file associated with the source operand of the corresponding store instruction.

Figure 5:
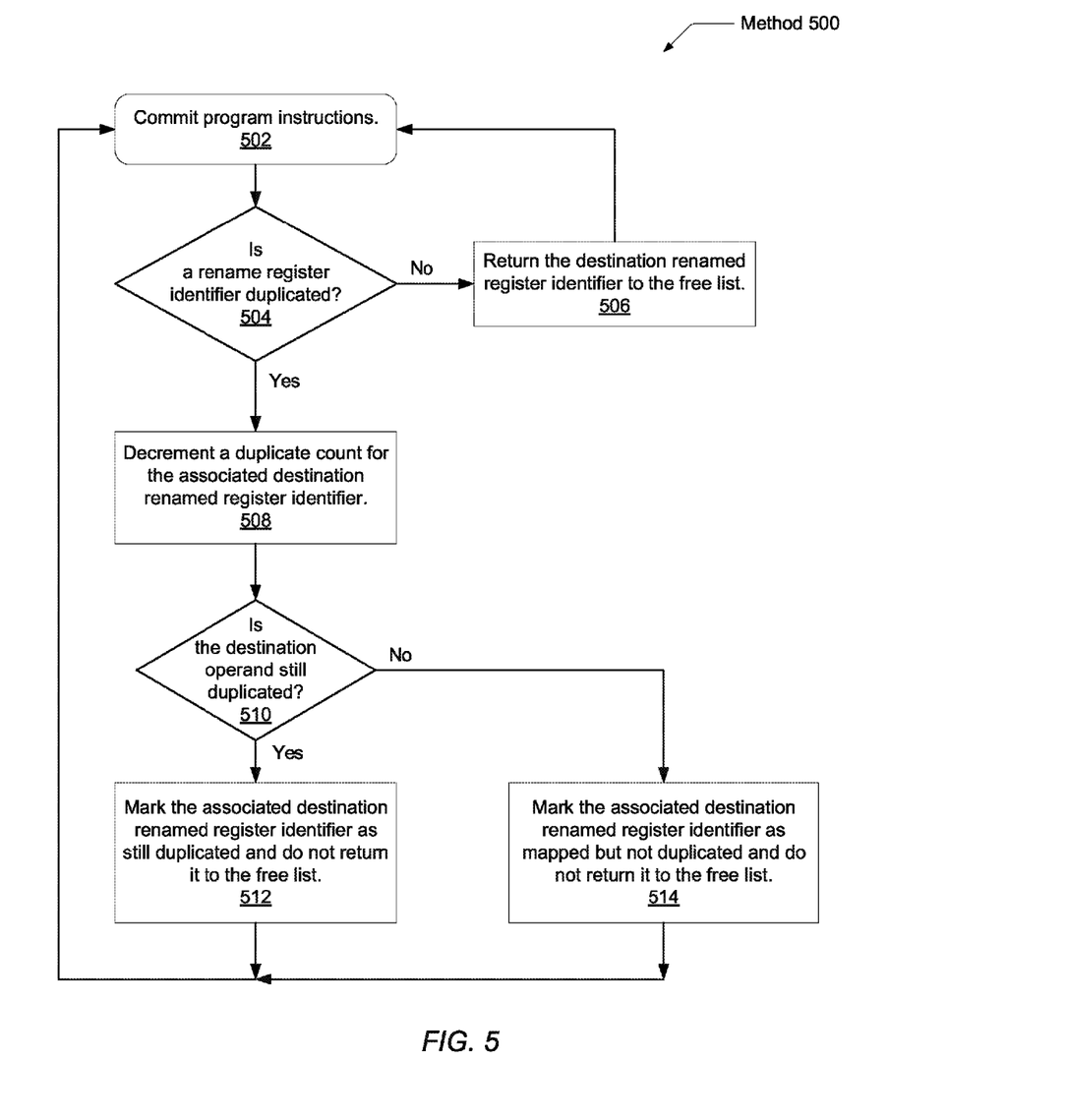
FIG. 5 is a generalized flow diagram of one embodiment of a method for committing instructions that include zero-cycle load operations.

Referring now to FIG. 5, a generalized flow diagram of one embodiment of a method 500 for committing instructions that include zero-cycle load operations is shown. For purposes of discussion, the steps in this embodiment and subsequent embodiments of methods 300 and 400 described earlier are shown in sequential order. However, in other embodiments some steps may occur in a different order than shown, some steps may be performed concurrently, some steps may be combined with other steps, and some steps may be absent.

In block 502, program instructions are being committed. An in-order window of instructions within a data structure may be used to determine when to commit and retire instructions. For example, the rob 270 may be used as the data structure. When memory instructions are detected to commit, a check may be performed to determine whether the associated rename register identifiers are duplicated. In one example, an associated duplicate flag or field indicating a status of duplication for each of the destination and the source physical registers may be stored with other associated information for the instruction. In another example, each of the destination and the source rename register identifier may be used to index into a data structure such as the RDA 224. A hit may indicate a corresponding rename register identifier is already duplicated. A miss may indicate the corresponding rename register identifier is not already duplicated.

If a given rename register identifier is not duplicated (conditional block 504), then in block 506, the rename register identifier is returned to the free list. Otherwise, in block 508, a duplicate count for the corresponding rename register identifier may be decremented. Generally, a duplicate count is decremented each time an associated rename register identifier is ready to return to the free list for any given architectural register. A rename register identifier may be determined to be ready to return to the free list in response to a mapping is removed from the mapping table. Typically, a rename register identifier is returned to the free list in response to a mapping is removed from the mapping table. However, with duplicate mappings in the mapping table due to zero-cycle load operations, a data structure, such as the RDA 224, may be inspected prior to any return to the free list.

After the duplicate count is decremented, if the rename register identifier is still duplicated (conditional block 510), then in block 512, the rename register identifier may be marked as still duplicated and it is not returned to the free list. For example, a valid entry in a data structure, such as the RDA 224, may still be present with a duplicate count greater than one.

After the duplicate count is decremented, if the rename register identifier is not still duplicated (conditional block 510), then in block 514, the rename register identifier may be marked as mapped but not duplicated. For example, an associated entry in a data structure, such as the RDA 224, may be invalidated. Alternatively, a valid entry may still be present with a duplicate count of one. The rename register identifier is not returned to the free list.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a memory dependence detector configured to:
  detect a given store instruction;
  store an address operand base register ID corresponding to an address operand base register and an address operand immediate value of the given store instruction in a first entry of a table;
  in response to detecting an instruction that is configured to perform a modification of the address operand base register:
    adjust the value of the address operand immediate value for the given store instruction in the first entry of the table, in response to determining the modification is an immediate value based modification; and
    invalidate the first entry in the table, in response to determining the modification is other than an immediate value based modification; and
  determine a memory dependence for a given load instruction on the given store instruction responsive to detecting a valid entry in the table indicates the given store instruction and the given load instruction have matching values for an address operand base register ID and an address operand immediate value; and
a register rename unit;
wherein in response to receiving an indication of the memory dependence, the register rename unit is configured to:
  assign a rename register identifier (ID) associated with a source operand register ID of the given store instruction to a destination operand register ID of the given load instruction;
  store a duplicate count associated with the rename register ID, wherein the duplicate count indicates a number of architectural register IDs currently mapped to a given rename register ID; and
  prevent the given load instruction from reading data associated with the source operand from memory.

2. The processor as recited in claim 1, wherein to prevent the given load instruction from reading data associated with the source operand from memory, the register rename unit is configured to indicate the given load instruction is to be completed after at least one of the following: the memory dependency is determined and the memory dependence is verified as correct.

3. The processor as recited in claim 2, wherein the register rename unit is further configured to decrement the duplicate count each time an instruction using an architectural register ID currently mapped to the rename register ID commits.

4. The processor as recited in claim 3, wherein to determine said memory dependence, the memory dependence detector is further configured to determine:
an intervening instruction is found between the given store instruction and the given load instruction in program order that has a destination operand register ID equal to the source operand register ID of the given store instruction; and
the given store instruction has not yet retired.

5. The processor as recited in claim 3, wherein the register rename unit is further configured to:
detect an instruction with a destination operand register ID assigned to the register rename ID is ready to commit; and
prevent the rename register ID from returning to a free list, in response to determining the rename register ID is duplicated.

6. The processor as recited in claim 3, wherein to determine said memory dependence, the memory dependence detector is further configured to determine no intervening instruction is found between the given store instruction and the given load instruction in program order that has a destination operand register ID equal to the source operand register ID of the given store instruction.

7. The processor as recited in claim 5, wherein the register rename unit is further configured to increment the duplicate count each time an architectural register ID currently not mapped to the rename register ID is mapped to the rename register ID.

8. The processor as recited in claim 5, wherein the processor further comprises a load/store unit configured to replay the given load instruction and program instructions that are younger in program order than the given load instruction, in response to determining the memory dependence is incorrect.

9. The processor as recited in claim 5, wherein the processor further comprises a physical register file configured to forward data associated with the source operand of the given store instruction to instructions younger in program order and dependent on the given load instruction.

10. A method comprising:
detecting a given store instruction;
storing an address operand base register ID corresponding to an address operand base register and an address operand immediate value of the given store instruction in a first entry of a table;

in response to detecting an instruction that is configured to perform a modification of the address operand base register:
adjusting the value of the address operand immediate value for the given store instruction in the first entry of the table, in response to determining the modification is an immediate value based modification; and
invalidating the first entry in the table, in response to determining the modification is other than an immediate value based modification; and
determining a memory dependence for a given load instruction on the given store instruction responsive to detecting a valid entry in the table indicates the given store instruction and the given load instruction have matching values for an address operand base register ID and an address operand immediate value; and
in response to receiving an indication of the memory dependence, the method further comprises:
assigning a rename register identifier (ID) associated with a source operand register ID of the given store instruction to a destination operand register ID of the given load instruction;
storing a duplicate count associated with the rename register ID, wherein the duplicate count indicates a number of architectural register IDs currently mapped to a given rename register ID; and
preventing the given load instruction from reading data associated with the source operand from memory.

11. The method as recited in claim 10, wherein to prevent the given load instruction from reading data associated with the source operand from memory, the method further comprises indicating the given load instruction is to be completed after at least one of the following: the memory dependency is determined and the memory dependence is verified as correct.

12. The method as recited in claim 11, further comprising decrementing the duplicate count each time an instruction using an architectural register ID currently mapped to the rename register ID commits.

13. The method as recited in claim 12, wherein to determine said memory dependence, the method further comprises determining:
an intervening instruction is found between the given store instruction and the given load instruction that has a destination operand register ID equal to the source operand register ID of the given store instruction; and
the given store instruction has not yet retired.

14. The method as recited in claim 13, further comprising issuing instructions younger in program order and dependent on the given load instruction with the given load instruction.

15. The method as recited in claim 10, further comprising invalidating the stored address operand base register ID and the address operand immediate value of the given store instruction responsive to determining another type of modification is made to the base register identifier of the given store instruction other than an immediate value based modification by an intervening instruction between the given store instruction and a given load instruction in program order.

16. The method as recited in claim 12, wherein to determine said memory dependence, the method further comprises determining no intervening instruction is found between the given store instruction and the given load instruction in program order that has a destination operand register ID equal to the source operand register ID of the given store instruction.

17. The method as recited in claim 13, further comprising:
detecting an instruction is ready to commit, wherein a destination operand register ID of the instruction is assigned to the register rename ID; and
preventing the rename register ID from returning to a free list in response to determining the rename register ID is duplicated.

18. The method as recited in claim 17, further comprising incrementing the duplicate count each time any given architectural register ID currently not mapped to the rename register ID is mapped to the rename register ID.

19. An apparatus comprising:
control logic;
a memory dependence detector configured to:
detect a given store instruction;
store an address operand base register ID corresponding to an address operand base register and an address operand immediate value of the given store instruction in a first entry of a table;
in response to detecting an instruction that is configured to perform a modification of the address operand base register:
adjust the value of the address operand immediate value for the given store instruction in the first entry of the table, in response to determining the modification is an immediate value based modification; and
invalidate the first entry in the table, in response to determining the modification is other than an immediate value based modification; and
determine a memory dependence for a given load instruction on the given store instruction responsive to detecting a valid entry in the table indicates the given store instruction and the given load instruction have matching values for an address operand base register ID and an address operand immediate value;
a register duplication array (RDA) comprising a plurality of entries, each entry configured to store a duplicate count which includes a number of mappings to any architectural register identifier (ID) for a particular rename register identifier (ID);
wherein in response to receiving an indication of the memory dependence, the control logic is configured to:
assign a rename register identifier (ID) associated with a source operand register ID of the given store instruction to a destination operand register ID of the given load instruction;
in response to said assigning the rename register ID, store a duplicate count associated with the rename register ID, wherein the duplicate count indicates a number of times any architectural register ID has been mapped to the same rename register ID; and
prevent the given load instruction from reading data associated with the source operand from memory.

* * * * *